(12) United States Patent
Sanchez et al.

(10) Patent No.: US 10,377,334 B2
(45) Date of Patent: Aug. 13, 2019

(54) LAMINATED AIRBAG HOUSING

(71) Applicant: Illinois Tool Works Inc., Glenview, IL (US)

(72) Inventors: Miguel Sanchez, Shelby, MI (US); Hin Chow, Troy, MI (US)

(73) Assignee: Illinois Tool Works Inc., Glenview, IL (US)

( * ) Notice: Subject to any disclaimer, the term of this patent is extended or adjusted under 35 U.S.C. 154(b) by 178 days.

(21) Appl. No.: 15/552,568

(22) PCT Filed: Jan. 26, 2016

(86) PCT No.: PCT/US2016/014919
§ 371 (c)(1),
(2) Date: Aug. 22, 2017

(87) PCT Pub. No.: WO2016/153595
PCT Pub. Date: Sep. 29, 2016

(65) Prior Publication Data
US 2018/0050649 A1 Feb. 22, 2018

Related U.S. Application Data

(60) Provisional application No. 62/186,909, filed on Jun. 30, 2015, provisional application No. 62/137,575, filed on Mar. 24, 2015.

(51) Int. Cl.
*B60R 21/20* (2011.01)
*B32B 5/02* (2006.01)
(Continued)

(52) U.S. Cl.
CPC ............... *B60R 21/20* (2013.01); *B32B 1/02* (2013.01); *B32B 3/266* (2013.01); *B32B 3/30* (2013.01); *B32B 5/022* (2013.01); *B32B 5/028* (2013.01); *B32B 27/12* (2013.01); *B32B 27/20* (2013.01); *B32B 27/32* (2013.01); *B32B 27/34* (2013.01); *B32B 2262/0261* (2013.01);
(Continued)

(58) Field of Classification Search
CPC ......... B60R 21/20; B32B 5/022; B32B 5/028; B32B 27/12; B32B 27/20; B32B 27/32; B32B 27/34; B32B 1/02; B32B 3/266; B32B 3/30; B32B 2262/0261; B32B 2262/0276; B32B 2264/101; B32B 2605/00
See application file for complete search history.

(56) References Cited

U.S. PATENT DOCUMENTS

2009/0315303 A1   12/2009   Ettinger
2014/0203540 A1   7/2014    Edeline

FOREIGN PATENT DOCUMENTS

DE   10062899   6/2002

OTHER PUBLICATIONS

International Search Report and Written Opinion for PCT/US2016/014919.

*Primary Examiner* — Michael C Miggins
(74) *Attorney, Agent, or Firm* — Quarles & Brady LLP

(57) ABSTRACT

An airbag housing incorporating a molded bin body adapted to store an airbag cushion. A plurality of molded-in surface ribs projects outwardly away from the exterior of the molded bin body. The molded bin body includes a layer of polymer substrate material disposed in over-molded relation to a layer of laminate material providing enhanced toughness and resistance to embrittlement at low temperatures.

19 Claims, 4 Drawing Sheets

(51) Int. Cl.
*B32B 27/12* (2006.01)
*B32B 27/20* (2006.01)
*B32B 27/32* (2006.01)
*B32B 27/34* (2006.01)
*B32B 1/02* (2006.01)
*B32B 3/26* (2006.01)
*B32B 3/30* (2006.01)

(52) U.S. Cl.
CPC . *B32B 2262/0276* (2013.01); *B32B 2264/101* (2013.01); *B32B 2605/00* (2013.01)

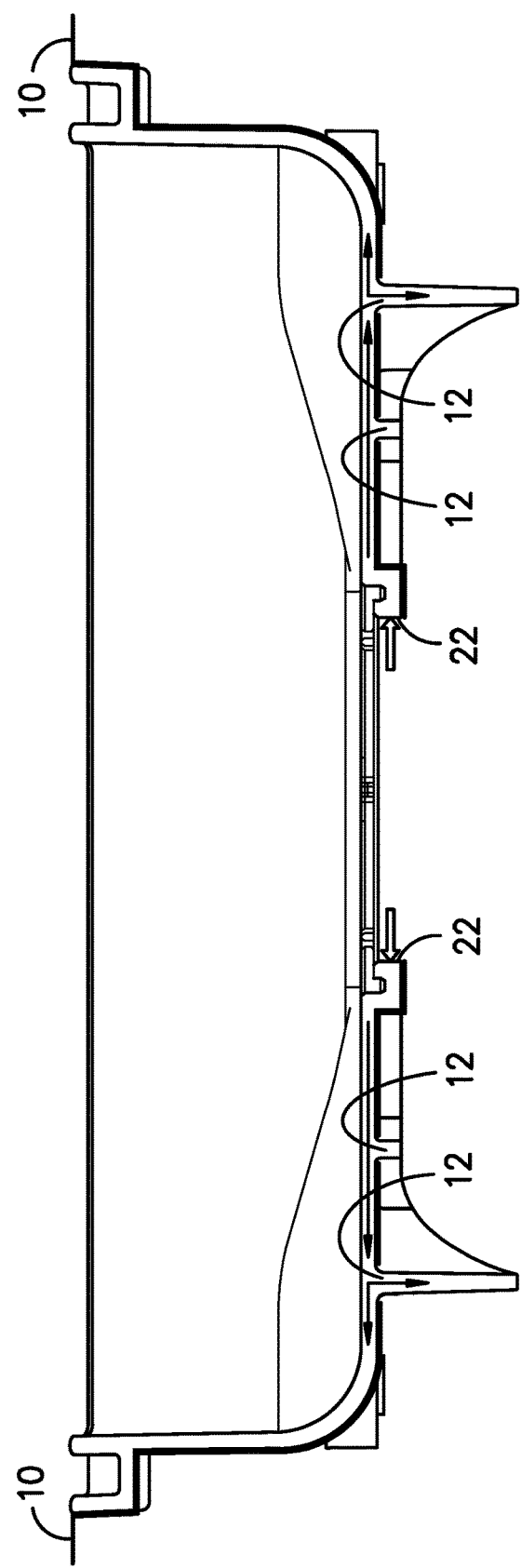
FIG. -1-

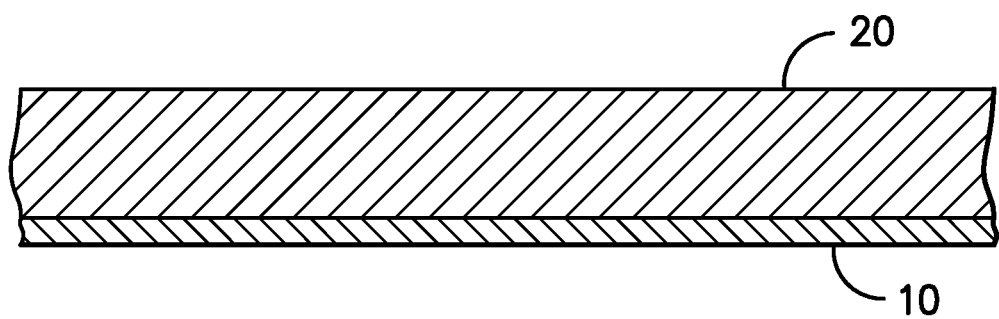
FIG. -2-

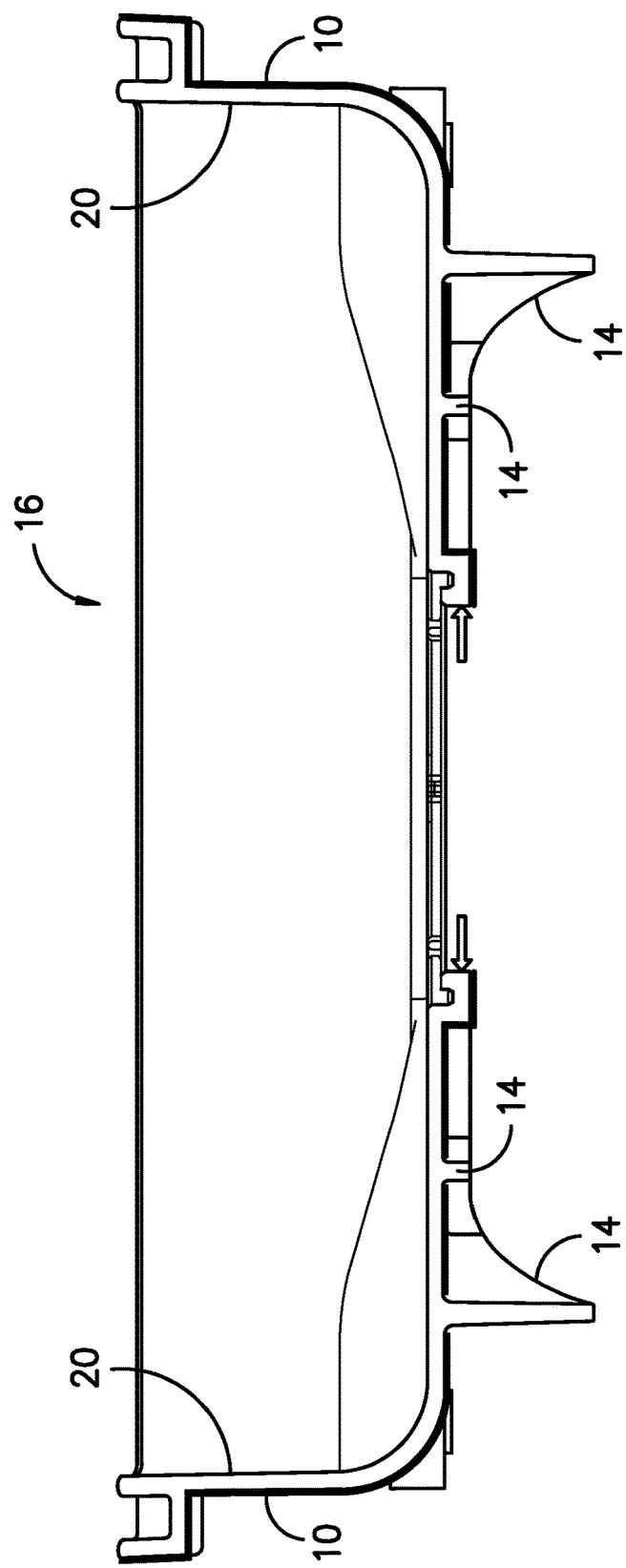
FIG. -3-

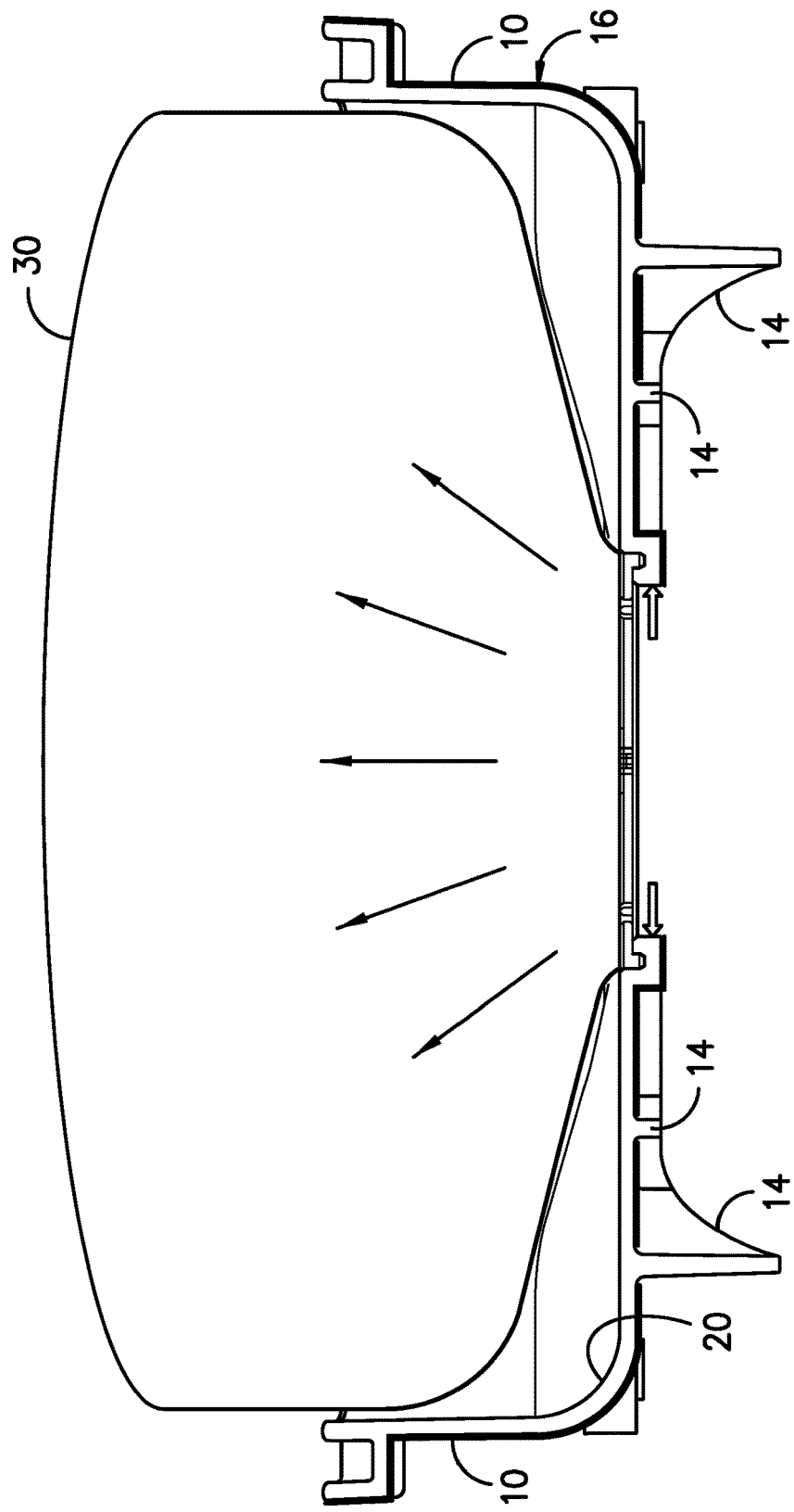
FIG. -4-

LAMINATED AIRBAG HOUSING

CROSS-REFERENCE TO RELATED APPLICATIONS

This non-provisional application is a National Phase of International Application No. PCT/US2016/014919, filed Jan. 26, 2016, which claims the benefit of, and priority from, U.S. provisional patent application No. 62/137,555 having a filing date of Mar. 24, 2015 and U.S. provisional patent application 62/186,909 having a filing date of Jun. 30, 2015. The contents of such referenced applications are hereby incorporated by reference in their entirety as if fully set forth herein.

TECHNICAL FIELD

The present disclosure relates to automotive components, and more particularly, to an airbag housing incorporating a reinforcing laminate such as film, polymeric mesh, inorganic mesh, fabric, or the like which may be adhered during a molding procedure. The resulting housing exhibits enhanced toughness and resistance to embrittlement at low temperature conditions. Such enhanced toughness and resistance to embrittlement may permit the use of lighter and/or thinner structural materials in the housing.

BACKGROUND OF THE DISCLOSURE

Inflatable airbag systems for use in transportation vehicles are well known. In such systems, a cushion of fabric or the like is typically inflated by a gas generating element when a sensor measures deceleration at a level corresponding to a crash event. Prior to activation, the cushion is typically stored in a bin-like housing which may be molded from a suitable polymeric material such as glass-filled Nylon (i.e. polyamide) or the like. By way of example only, and not limitation, one such known material for use in forming airbag housings is a composite of Nylon 6 (also known as PA-6) with about 40% glass having a thickness of about 3 mm. Of course, other construction materials, fillers and thicknesses are also used While known prior housings may be fully functional, such housings are typically designed with additional thickness and/or stiffening ribs or other features to promote integrity over a wide range of operating conditions. In particular, such additional thickness or other strengthening features may be incorporated to promote integrity at low temperature conditions. In this regard, low temperature conditions may cause some degree of embrittlement in various molded polymeric materials. The practice of increasing thickness and/or including strengthening features is used to ensure that any embrittlement that may occur will not lead to a loss of integrity when the housing is subjected to the forces associated with airbag deployment at low temperature.

The practice of using additional thickness and/or including molded-in ribs or other strengthening features in airbag housings is generally successful in overcoming any issues associated with embrittlement. However, designing in significant additional thickness and/or other strengthening features may result in added complexity or cost during the manufacturing process. Moreover, such added materials will necessarily increase the weight of the housing. Increased weight is generally considered to be undesirable in transportation vehicles due to corresponding additional fuel consumption requirements. Accordingly, an airbag housing which maintains its integrity at low temperature conditions with reduced thickness requirements would represent a significant advancement over the known art.

SUMMARY

The present disclosure offers advantages and alternatives over the prior art by providing an airbag housing defining a bin structure incorporating a molded polymeric substrate with an overlying laminate layer. The laminate layer may have any suitable structure, although a film or mesh structure may be particularly advantageous. The resulting layered structure exhibits substantial resistance to embrittlement even at low temperature conditions. Thus, the overall material thickness may be reduced without negatively impacting performance over the full range of potential operating conditions.

In accordance with one exemplary feature, a laminate layer of film, mesh or the like may be applied during a molding process such as injection molding or the like wherein the laminate layer is introduced into a mold cavity and a polymer substrate material is then introduced in an over-molding operation. The resulting housing thus has a molded polymer substrate layer with an adhered surface laminate layer. Although the laminate layer is extremely thin and light, significantly enhanced dynamic toughness at low temperature is nonetheless provided. Accordingly, the thickness of the polymer substrate layer and additional reinforcement feature may be minimized while structural integrity is maintained.

In accordance with one exemplary aspect, the present disclosure provides an airbag housing comprising a molded bin adapted to store an airbag cushion. The molded bin includes a bottom and a plurality of sidewalls extending upwardly from the bottom. The bottom and sidewalls define a bin body. The bin further includes a plurality of surface ribs projecting downwardly away from the bottom. The bin body comprises a layer of polymer substrate material disposed in over-molded relation to a layer of laminate material. The laminate material may be selected from the group consisting of polymer films, polymer fabrics, polymeric meshes and non-polymeric meshes such as metallic mesh and the like. The laminate material may define an exterior surface of the bin body in zones outboard from the surface ribs but does not extend in covering relation to the surface ribs.

While exemplary features of the disclosure are illustrated and will hereinafter be described in connection with certain potentially preferred embodiments and practices, it is to be understood that in no event is the disclosure limited to such illustrated and described embodiments and practices. On the contrary, it is intended that the present disclosure shall extend to all alternatives and modifications as may embrace the general principles of this disclosure within the full and true spirit and scope thereof.

BRIEF DESCRIPTION OF THE DRAWINGS

FIG. 1 is a schematic cut-away view illustrating an exemplary over-molding procedure for adjoining a discontinuous film laminate layer and a housing substrate material in an airbag housing;

FIG. 2 is a schematic view illustrating the housing substrate material typically in adjacent over-molded relation to the film laminate layer in the airbag housing of FIG. 1;

FIG. 3 is a cut-away schematic view illustrating an exemplary airbag housing incorporating housing substrate material in adjacent over-molded relation to a film laminate layer; and FIG. 4 is a cut-away schematic view illustrating the exemplary airbag housing of FIG. 3 with a deployed airbag cushion.

Before various embodiments of the disclosure are explained in detail, it is to be understood that the disclosure is not limited in its application to the details of construction and the arrangements of the components set forth in the following description or illustrated in the drawings. The disclosure is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DESCRIPTION

Features of the present disclosure will now be described through reference to the various figures. Referring now to the drawings, FIG. 1 illustrates an exemplary over-molding procedure for adjoining a laminate and a housing substrate during housing formation. In this exemplary procedure, a laminate layer 10 such as a high strength polymeric film, synthetic mesh, fabric or the like may be heated and laid into one side of an injection mold. In this regard, it will be understood that the mold will have an internal cavity configuration generally corresponding to the final desired structure. Retractable push blocks and push pins (not shown) may be used to shape the laminate layer 10 to conform to the mold surface. Thus, the laminate layer 10 may be held to make substantially full contact with the mold surface. In this regard, it will be understood that the mold will have a substantially reverse configuration to the final desired housing shape so as to permit formation of polymer substrate material during injection molding or the like.

By way of example only, one suitable laminate layer 10 is believed to be a high strength polyethylene film sold under the trade designation VALERON®, although it is likewise contemplated that other films also may be suitable. Another potentially desirable laminate layer 10 may be a synthetic mesh formed from polymeric fibers. By way of example only, various exemplary polyamide (i.e. Nylon) meshes may be used as the laminate layer 10 if desired. Various exemplary PET (i.e. polyester) meshes may likewise be used as the laminate layer in accordance with the present disclosure. Various exemplary polypropylene meshes also may be used as the laminate layer in accordance with the present disclosure. All such meshes (Nylon, polyester, polypropylene) may have physical characteristics such as mesh opening, open area, mesh count, thread diameter, weight, thickness and permeability which may be adjusted to promote desirable bonding and strength characteristics in the final molded product. Yet another potentially desirable laminate layer may be a fabric having a woven, knit or non-woven construction. It has been found that the use of two or more laminate layers 10 of polymer mesh or other suitable material may aid in promoting strength in some environments of use.

By way of example only, and not limitation, it is contemplated that suitable polyamide mesh materials may have weights in the range of about 15 g/m² to about 325 g/m² with a thickness in the range of about 50 μm to about 950 μm, a thread diameter in the range of about 30 μm to about 500 μm and an open area in the range of about 5% to about 65%. However, alternative constructions may likewise be used if desired.

It is contemplated that suitable polyester mesh materials may have weights in the range of about 20 g/m² to about 425 g/m² with a thickness in the range of about 45 μm to about 1100 μm, a thread diameter in the range of about 25 μm to about 600 μm and an open area in the range of about 5% to about 65%. However, alternative constructions may likewise be used if desired.

It is contemplated that suitable polypropylene mesh materials may have weights in the range of about 50 g/m² to about 275 g/m² with a thickness in the range of about 200 μm to about 1000 μm, a thread diameter in the range of about 75 μm to about 500 μm and an open area in the range of about 20% to about 50%. However, alternative constructions may likewise be used if desired.

As shown, the laminate layer 10 lining the mold may include a pattern of pre-formed openings 12 corresponding to flow paths in the mold used for transport of molten polymer during the molding process to produce surface features 14 such as strengthening ribs and the like across the underside and/or sidewalls of the housing 16 (FIG. 3) in its finished condition.

With the laminate in place, the molding procedure may then occur, thereby forming a housing 16 of a bin shape generally known to those of skill in the art. During the molding operation, a polymer substrate material 20 may be introduced into the mold to establish an over-molded relation between the laminate layer 10 and polymer substrate material 20 (FIG. 2). By way of example only, and not limitation, one suitable exemplary polymer substrate material 20 may be Nylon 6 with about 15% to about 40% glass filler and more preferably with about 30% glass filler. Another suitable exemplary polymer substrate material 20 may be polypropylene with about 15% to about 40% glass filler and more preferably with about 30% glass filler. Yet another suitable exemplary polymer substrate material 20 may be impact modified polypropylene with no glass. Of course, other base polymers and/or higher or lower glass percentages may be used if desired.

Following the molding procedure, the housing 16 defines a molded bin having a bottom and a plurality of sidewalls extending upwardly from the bottom. The molded bin is adapted to contain an airbag cushion 30 in folded relation in a storage zone between the sidewalls prior to deployment (FIG. 4). Surface features 14 such as strengthening ribs and the like may project downwardly away from the exterior of the bottom.

As illustrated in FIG. 1, in accordance with one exemplary practice, the molding process may utilize a multiplicity of injection gates 22 used for introduction of the molten polymer substrate material 20. In this regard, four injection gates are typically used, although a larger or smaller number may likewise be utilized if desired. Following this introduction, the polymer substrate material 20 may then flow in a path to substantially cover the laminate layer 10 and to flow into the mold cavities corresponding to the various desired surface features as indicated by the arrows. As will be appreciated, the pre-formed openings 12 in the laminate layer 10 facilitate the filling process by permitting the polymer substrate material 20 to pass into the cavities corresponding to the various protruding surface features 14 disposed across the underside of molded housing 16 (FIG. 3) without substantial interference.

If desired, an adhesive may be used to aid in bonding the polymer substrate material 20 and laminate layer 10 together. By way of example only, and not limitation, one potentially desirable adhesive is believed to be available under the trade designation NOLAX® although other adhesives may also be used. Moreover, it is to be understood that an adhesive may be eliminated when suitable direct bonding is achieved between the substrate and the adjoined laminate layer.

Following the molding operation, the resultant airbag housing (FIG. 3) will have a laminate layer 10 disposed in wrapping relation partially or entirely across the exterior. Such a wrapping layer may substantially reduce dynamic load during cushion deployment and may aid in trapping debris in the event of fragmentation. Moreover, the presence of the laminate layer 10 may permit the use of thinner and/or less costly materials with a reduced need for reinforcement ribs even in cold weather conditions. Thus, less material and/or simpler designs may be used. In this regard, in accordance with one contemplated practice, it is anticipated that the thickness of the airbag housing may be reduced, thereby substantially reducing complexity and material costs while maintaining equivalent performance in cold weather conditions.

As shown, the laminate layer 10 is discontinuous across the airbag housing 16. More specifically, the laminate layer 10 does not cover the exterior surfaces of the protruding surface features 14 disposed across the bottom of the molded housing 16 (FIG. 3). As will be appreciated, these protruding surface features 14 are free from coverage by the laminate layer due to the presence of the preformed openings 12 in the laminate layer 12. Nonetheless the presence of the laminate layer across the perimeter walls of the airbag housing 16 and the surfaces of the underside adjacent to the protruding surface features 14 will still provide substantial benefits.

Referring to FIG. 4, the operation of an exemplary airbag housing 16 consistent with the present disclosure is illustrated. During use, an airbag cushion 30 may be deployed by rapid introduction of inflation gas from an inflator (not shown) in a manner as will be well known to those of skill in the art. During the inflation event, the airbag housing 16 is required to substantially contain the lateral sides of the airbag cushion 30 such that the cushion 30 is directed outwardly in a desired direction. Substantial forces are thereby applied against the perimeter walls and underside of the housing 16. Under these extreme conditions, the polymer substrate material 20 is required to withstand significant forces. In the event that the polymer substrate material has become embrittled due to cold weather conditions or is otherwise weakened, the presence of the laminate layer 10 will act to substantially dissipate the applied forces, while also containing any fragments in the event of substrate failure.

As will be understood, the presence of the laminate layer 10 will in no way interfere with the strengthening function provided by any protruding surface features 14 such as ribs and the like across the underside of the airbag housing which are free from coverage by the laminate layer 10. To the contrary, the presence of the laminate layer 10 across the perimeter walls of the airbag housing 16 and the surfaces of the underside adjacent to the protruding surface features 14 may reduce the load requirements for such surface features and thereby improve overall performance.

Of course, variations and modifications of the foregoing are within the scope of the present disclosure. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An airbag housing comprising: a molded bin body adapted to store an airbag cushion, the molded bin body having a bottom and a plurality of sidewalls extending upwardly from the bottom, wherein a plurality of molded-in surface ribs projects downwardly away from the bottom, wherein the molded bin body comprises a layer of polymer substrate material disposed in over-molded relation to a layer of laminate material selected from the group consisting of polymer films, polymer or nonpolymer meshes and polymer fabrics, and wherein the laminate material defines a layer of the molded bin body and wherein the surface ribs do not include the laminate material.

2. The airbag housing as recited in claim 1, wherein the polymer substrate material comprises modified polypropylene substantially devoid of glass filler.

3. The airbag housing as recited in claim 1, wherein the laminate material comprises a polyethylene film.

4. The airbag housing as recited in claim 1, wherein the polymer substrate material comprises polyamide with glass filler.

5. The airbag housing as recited in claim 4, wherein the polymer substrate material comprises Nylon 6 with about 15% to about 40% glass filler.

6. The airbag housing as recited in claim 1, wherein the polymer substrate material comprises polypropylene with glass filler.

7. The airbag housing as recited in claim 6, wherein the polymer substrate material comprises polypropylene with about 15% to about 40% glass filler.

8. The airbag housing as recited in claim 1, wherein the laminate material comprises a polyamide yarn mesh characterized by an interstitial open area between yarns in the range of about 5% to about 65%.

9. The airbag housing as recited in claim 8, wherein the polyamide yarn mesh has a weight in the range of about 15 g/m² to about 325 g/m², a thickness in the range of about 50 μm to about 950 μm, and a thread diameter in the range of about 30 μm to about 500 μm.

10. The airbag housing as recited in claim 1, wherein the laminate material comprises a polyester yarn mesh characterized by an interstitial open area between yarns in the range of about 5% to about 65%.

11. The airbag housing as recited in claim 10, wherein the polyester yarn mesh has a weight in the range of about 20 g/m² to about 425 g/m², a thickness in the range of about 45 μm to about 1100 μm, and a thread diameter in the range of about 25 μm to about 600 μm.

12. The airbag housing as recited in claim 1, wherein the laminate material comprises a polypropylene yarn mesh characterized by an interstitial open area between yarns in the range of about 20% to about 50%.

13. The airbag housing as recited in claim 12, wherein the polypropylene yarn mesh has a weight in the range of about 50 g/m² to about 275 g/m², a thickness in the range of about 200 μm to about 1000 μm, and a thread diameter in the range of about 75 μm to about 500 μm.

14. An airbag housing comprising: a molded bin body adapted to store an airbag cushion, the bin body having a bottom and a plurality of sidewalls extending upwardly from the bottom, wherein a plurality of molded-in surface ribs projects downwardly away from the bottom, wherein the molded bin body comprises a layer of polymer substrate material disposed in over-molded relation to a layer of laminate material selected from the group consisting of polymer films, polymer meshes and polymer fabrics, and wherein the laminate material defines an exterior surface of the molded bin body and wherein the surface ribs do not include the laminate material, wherein the polymer substrate material is selected from the group consisting of; polyamide with glass filler, polypropylene with glass filler, and modified polypropylene substantially devoid of glass filler.

15. The airbag housing as recited in claim 14, wherein the laminate material comprises polyethylene film.

16. The airbag housing as recited in claim 14, wherein the laminate material comprises polyamide yarn mesh characterized by a weight in the range of about 15 g/m² to about 325 g/m² and a thickness in the range of about 50 μm to about 950 μm.

17. The airbag housing as recited in claim 14, wherein the laminate material comprises polyester yarn mesh characterized by a weight in the range of about 20 g/m² to about 425 g/m² and a thickness in the range of about 45 μm to about 1100 μm.

18. The airbag housing as recited in claim 14, wherein the laminate material comprises polypropylene yarn mesh characterized by a weight in the range of about 50 g/m² to about 275 g/m² and a thickness in the range of about 200 μm to about 1000 μm.

19. An airbag housing comprising: a molded bin body adapted to store an airbag cushion, the bin body having a bottom and a plurality of sidewalls extending upwardly from the bottom, wherein a plurality of molded-in surface ribs projects downwardly away from the bottom, wherein the molded bin body comprises a layer of polymer substrate material disposed in over-molded relation to a layer of laminate material and wherein the laminate material defines an exterior surface of the molded bin body and wherein the surface ribs do not include the laminate material, wherein the polymer substrate material is selected from the group consisting of; polyamide with glass filler, polypropylene with glass filler, and modified polypropylene substantially devoid of glass filler and wherein the laminate material is selected from the group consisting of: polyethylene film; polyamide yarn mesh characterized by a weight in the range of about 15 g/m² to about 325 g/m² and a thickness in the range of about 50 μm to about 950 μm; polyester yarn mesh characterized by a weight in the range of about 20 g/m² to about 425 g/m² and a thickness in the range of about 45 μm to about 1100 μm; and polypropylene yarn mesh characterized by a weight in the range of about 50 g/m² to about 275 g/m² and a thickness in the range of about 200 μm to about 1000 μm.

* * * * *